United States Patent [19]

Cosyns et al.

[11] 4,019,976

[45] Apr. 26, 1977

[54] PROCESS FOR HYDROGENATING HIGHLY UNSATURATED HEAVY HYDROCARBON CUTS

[75] Inventors: Jean Cosyns, Nanterre; Jean-Pierre Franck, Bougival; Jean-Claude Guibet, Le Vesinet; Yves Jacquin, Sevres, all of France

[73] Assignee: Institut Francais du Petrole, Rueil-Malmaison, France

[22] Filed: Apr. 21, 1975

[21] Appl. No.: 569,788

[30] Foreign Application Priority Data

Apr. 24, 1974 France .................. 74.14536

[52] U.S. Cl. ..................... 208/57; 252/465; 252/470; 260/667
[51] Int. Cl.$^2$ ..................... C10G 23/02
[58] Field of Search ............. 208/57; 260/667

[56] References Cited

UNITED STATES PATENTS

| 2,744,052 | 5/1956 | Nozaki | 260/667 |
|---|---|---|---|
| 2,765,617 | 10/1956 | Gluesenkamp et al. | 260/667 |
| 3,313,859 | 4/1967 | Doane | 260/667 |
| 3,493,493 | 2/1970 | Henke et al. | 208/264 |
| 3,728,250 | 4/1973 | Hass et al. | 260/667 |

FOREIGN PATENTS OR APPLICATIONS

| 2,123,753 | 2/1971 | Germany | 208/57 |

*Primary Examiner*—Herbert Levine
*Attorney, Agent, or Firm*—Millen & White

[57] ABSTRACT

Process for hydrogenating a highly unsaturated hydrocarbon cut, boiling above 200° C under atmospheric pressure, comprising passing said cut successively over two catalysts, each of which contains an alumina carrier, (a) at least one molybdenum and/or tungsten compound and (b) at least one nickel and/or cobalt compound, the ratio $b/a$ expressed in gram-atoms of metals, being from 1.5:1 to 10:1 for the first catalyst and from 0.1:1 to 1:1 for the second catalyst and the alumina carrier of the first catalyst having a heat of neutralization by ammonia absorption lower than 10 calories per gram under an ammonia pressure of 300 mmHg.

16 Claims, No Drawings

PROCESS FOR HYDROGENATING HIGHLY UNSATURATED HEAVY HYDROCARBON CUTS

This invention concerns a process for the catalytic treatment under hydrogen pressure, in two steps, over two separate catalysts, of highly unsaturated heavy cuts, so as to produce motor fuels and/or fuel components and/or basic materials in the petrochemical field.

The treated feeds are cuts boiling, at least for the most part, beyond the range of gasolines (e.g. above 200° C) as produced by pyrolysis processes such as visbreaking, coking, steam-cracking and other hydrocarbon conversion processes such, for example, as reforming which, in addition to the desired products, also yields a residue heavier than gasoline in a variable proportion.

These cuts are noted by their very low content of saturated hydrocarbons, less than 20% by weight, e.g. from 0 to 10 % by weight, and by a very high content of alkylaromatic, polyaromatic, indenic and alkenylaromatic compounds, greater than 80% by weight, e.g. from 90 to 100% by weight.

These products are highly unstable and suffer from a number of disadvantages: a sulfur content of the pyrolysis products usually higher than 0.1% and, for example, in the range from 0.5 to 2% by weight, instability during storage as a result of a strong tendency to the formation of gums and polymers, which tendency even results in difficulties for the use of these compounds as fuels.

The difficulties which arise when using these cuts may be avoided by effecting a suitable catalytic treatment of said cuts under hydrogen pressure. During this hydrotreatment, the unsaturated hydrocarbons are more or less strongly hydrogenated according to the contemplated use for the treated products.

The conventional hydrotreatments with usual catalysts containing group VIII metal sulfides associated with group VI A metal sulfides, are not economical for this type of cuts, in view of the very short running periods (e.g. 1 to 3 months) which are the consequence of a substantial polymerization within the catalyst bed, which may result in a complete clogging of the reactor. Moreover, the clogging of the catalyst bed results in a progressive deactivation thereof which may be partially compensated by an increase in temperature within the catalyst bed, but these new operating conditions become less and less favorable to the hydrogenation, so that the required hydrogenation rate cannot be obtained.

The process of this invention avoids the above-mentioned disadvantages. According to the process of the invention, the feed charge to be treated is passed with hydrogen over two successive catalysts. The first catalyst contains at least one nickel and/or cobalt compound and at least one molybdenum and/or tungsten compound incorporated to or deposited on an alumina carrier, the ratio $$R = \frac{\text{Ni and/or Co}}{\text{W and/or Mo}},$$

in which the metal proportions are expressed in gram-atoms of metal, being in the range from 1.5 : 1 to 10 : 1, preferably from 2 : 1 to 5 : 1. The object of this first catalyst is mainly to hydrogenate without polymerization the most unstable compounds of the feed charge, such for example as alkenylaromatic and/or indenic compounds.

The second catalyst, acting after the first one, also contains at least one nickel and/or cobalt compound and at least one molybdenum and/or tungsten compound incorporated with or deposited or an alumina carrier, the ratio $$R = \frac{\text{Ni and/or Co}}{\text{W and/or Mo}},$$

in which the metal proportions are expressed as above, being from 0.1 : 1 to 1 : 1 and preferably from 0.25 : 1 to 0.6 : 1. This second catalyst mainly functions to hydrodesulfurize and hydrogenate to a certain extent the aromatic compounds present in the treated charge or formed during the first step of the treatment.

According to a preferred embodiment, both catalysts are placed in the same reactor, one after the other.

As carrier, it is preferable to make use of aluminas of low acidity, particularly for the first catalyst (CATA A). A particularly suitable alumina carrier of low or zero acidity has a heat of neutralization by ammonia absorption preferably lower than 10 calories, and more particularly lower than 7 calories per gram of alumina at 320° C under a reduced pressure of 300 mm Hg.

The acidity of the catalyst may be determined by the known test of ammonia absorption, such as described, for example, in "Journal of Catalysis 2, 211–222 (1963)": the method consists of heating the catalyst at 600° C under vacuum (i.e. at a pressure lower than about 0.01 mm Hg) up to complete gas removal (mainly for removing water and undesirable impurities); the catalyst is then placed in a calorimeter at 320° C where ammonia is introduced in such an amount that the final pressure of the system at equilibrium attains 300 mm Hg, and the amount of heat evolved is measured.

The preferred alumina used as carrier might also be defined as inert with respect to the cracking and coking reactions in the presence of hydrogen. This inertness may be tested in any convenient manner. By way of example, it is possible to make use as a test of the cracking of an easily crackable molecule such as n-heptane. The alumina will be considered as inert if, at a temperature of 500° C, n-heptane introduced at a spatial velocity of 1, over a carrier laid in fixed bed in a reactor, under a hydrogen pressure of 20 bars and at a flow rate of the latter of 4 moles per mole of n-heptane of the feed charge, is recoversed at the outlet of the reactor at a rate of at least 99% by weight with respect to the supplied amount.

Aluminas complying with this specification comprise, for example, aluminas obtained by roasting tetragonal boehmite, aluminas impregnated with nickel and/or cobalt and subsequently treated at high temperature according to the teaching of the French Pat. No. 2,118,309, aluminas treated with alkaline or earth-alkaline metals from groups I and II, etc. The physical characteristics of these carriers are preferably as follows:

Specific surface: in the range from 10 to 300 m²/g, and preferably from 40 to 200 m²/g; total pore volume in the range from 0.1 to 1 cc/g and preferably from 0.3 to 0.8 cc/g; average pore diameter from 50 to 1 000 A and preferably from 80 to 500 A.

The alumina carrier of the second catalyst may be selected from the preceding ones; however, it does not result in a serious inconvenience to make use of a carrier having a moderate acidity.

The catalyst metals, at the reaction temperature, are usually in the form of oxides. It is however preferred to make use of the same metals in a sulfurized form. The sulfuration may be performed before the starting of the run, e.g. by passing a mixture ($H_2 + H_2S$), but it is also possible to sulfurize by means of the feed charge at the beginning or in the course of the operation. It is preferred that at least one sulfur atom be present per atom of active metal.

Preferred catalysts are those containing the following metal couples: Ni W, Ni Mo, Co Mo or Co W, the preferred catalyst being Ni W.

The operating conditions of the hydrogenation treatment according to the process of the invention are as follows:

the total pressure is in the range from 10 to 300 bars and preferably from 30 to 200 bars, the temperature is from 200° to 400° C, preferably from 250° to 335° C for catalyst A and preferably from 300° to 370° C for catalyst B, the amount of hydrogen introduced with the feed charge will be proportional to the hydrogen chemical consumption and generally, in the range from 100 to 1000 $Nm^3/m^3$ of feed charge, the rate of gas recycling, as measured by the ratio $H_2$/hydrocarbons, is usually from 100 to 2000 $Nm^3/m^3$ and for example from 500 to 1500 $Nm^3/m^3$.

The respective amounts of the catalysts A and B are preferably such that the ratio by weight of catalyst B to catalyst A be in the range from 1 : 1 to 9 : 1 and preferably from 1.8 : 1 to 4 : 1.

The total content of active metals, calculated as the weight of Mo, W, Ni and/or Co, of each of the catalysts, is usually at least 2%, preferably not higher than 40%, these values being, however, not limitative.

Each of the main beds A and B may be fractionated into two or more secondary beds between which cold hydrogen and/or cold hydrogenated product is recycled, this provision making possible a better control of the temperature elevation in the reaction as a result of the high exothermicity of the hydrogenation reactions.

Depending on the treated charge and the selected operating conditions, i.e. the desired hydrogenation degree, it is possible, according to the invention, to obtain a range of products which may be useful, for example, as fuel adapted to be admixed with a combustible fuel (ASTM fuel No 2, for example) as component of a gas-oil mixture for a Diesel engine, as jet fuel of high energy content per volume unit, as heat transfer fluid which may be used, for example, in nuclear power plants or still as starting materials for petrochemicals in view of producing, for example, naphthalene.

The main advantages of the process of the invention are: the wide range of the charges which may be treated, the capacity of producing at will a wide range of highly valuable products and, above all, long running periods, irrespective of the treatment concerned.

The feed charges generally have a bromine number (g/100g) of at least 3 and, in most cases, at least 10.

The following table gives non limitative examples of feed charges which can be treated according to the process of the invention.

TABLE I

| Origin Reference | A* | Steam-cracking residue B** | C | D | Reforming residue E |
|---|---|---|---|---|---|
| Distillation range ° C | 200+ | 200–250 | 200–330 | 200–360 | 210–300 |
| % b.w. of the total residue | 100 | 31 | 56 | 65 | 100 |
| $d_4^{15}$ | 1.064 | 0.992 | 1.000 | 1.007 | 0.990 |
| S ppm (b.w ) | 7200 | 1770 | 3800 | 7000 | 5 |
| $N_2$ppm (b.w.) | | | | 69 | |
| % aromatics by weight | 97 | 96 | 97 | 98 | 100 |
| Conradson carbon % b.w. | 12.2 | 0.06 | 0.012 | 0.04 | |
| Viscosity cst at 20° C | 243 | 2.58 | 3.60 | 3.62 | |
| Viscosity cst at 50° C | 34.2 | 1.46 | | 1.92 | |
| Distillation ASTM ° C | | | | | |
| IP | 207 | Product partially crystallized at room temperature | 203 | 205 | 233 |
| 10% | 230 | | 220 | 224 | 239 |
| 50% | 285 | | 240 | 247 | 248 |
| 90% | | | 304 | 326 | 265 |
| FP | | | 334 | 351 | 283 |
| Bromine number g/100g*** | 26 | 33 | 12.5 | 21 | 4 |

*30 % by weight of this charge distills over 380° C
**It has been determined by mass spectrometry that said charge contains 60% b.w. of naphthalenic hydrocarbons.
***The bromine index is measured according to the method ASTM No D 1159 and essentially corresponds, in the considered case, to the presence of indenic and alkenyl aromatic compounds.

The advantages resulting from the present invention are illustrated by the following non limitative examples.

EXAMPLE 1

This example relates to the manufacture of two catalysts.

The first catalyst A, which must be used at the top of the reactor, according to the process of the invention, is prepared in the following manner:

To an alumina carrier of a specific surface (BET) of 190 $m^2/g$, having a total pore volume of 0.6 cc/g and an acidity, measured by ammonia adsorption according to the above-described method, equal to 5 calories per gram, there is incorporated 10% by weight of NiO and 10% by weight of $WO_3$ by impregnation with a mixture in solution of nickel nitrate and ammonium metatungstate, the resulting catalyst being then dried and roasted in an air stream at 550° C for 2 hours.

The second catalyst (CATA. B) placed in the reactor after catalyst A, according to the process of the invention, is a hydrotreatment catalyst consisting of nickel oxide and tungsten oxide in a proportion of 3.4% by weight of NiO and 24.7% b.w. of $WO_3$, admixed with an alumina gel. The metal elements are incorporated in a conventional manner by malaxing the alumina gel, in the presence of water, with the desired proportions of nickel nitrate and ammonium metatungstate. The resulting paste is extruded and then roasted in air at a temperature of about 550° C, so as to obtain the corresponding nickel and tungsten oxides. Another satisfactory method consists of impregnating the alumina, preliminarily shaped, by means of aqueous solutions of the catalyst metal salts, the alumina gel having a pore volume of 0.6 cc/g and an acidity of 35 calories per gram.

The physico-chemical characteristics of the so-prepared catalysts may be summarized as follows:

TABLE II

| Shape | CATA. A | CATA. B |
|---|---|---|
| | Balls of 3 to 5 mm | Extrudates of 1.5 mm diameter |
| Filling factor g/cc | 0.80 | 0.81 |
| Total pore volume cc/g | 0.45 | 0.43 |
| Specific surface m²/g | 150 | 183 |

In this example, the treated material consists of a steam-cracking residue boiling above 200° C (charge A-Table I)

Three experiments are conducted in the following manner:
1. In the first experiment, catalyst A is used alone.
2. In the second experiment, catalyst B is used alone.
3. In the third experiment, both catalysts A and B are used, and they are placed separately in successive fixed beds in the reactor, the sequential order being A-B; the ratio by weight of catalyst B to catalyst A being 4 : 1.

In these three experiments, the operating conditions are the following:

hydrogen partial pressure in the reactor ($ppH_2$): 100 bars, overall space velocity in the reactor (PPH): 0.5 kg of hydrocarbon charge per Kg of catalyst and per hour, hydrogen recycling: 1500 liters (at normal temperature and pressure per liter of feed charge), temperature varying during the test.

Before the introduction of the feed charge to be treated, the catalyst are treated at 350° C by means of a hydrogen gas containing 2% by volume of hydrogen sulfide, the operation being continued until the amount of sulfur introduced equals 10% by weight of the catalyst, the gas flow rate being 500 liters per liter of catalyst and per hour.

Each of these experiments is stopped when, under the operating conditions, the pressure drop in the reactor ($\Delta P$) is higher than or equal to 10 bars.

The results of these three experiments are summarized in the three following tables in which are indicated, in relation with the running period:

the temperature at the inlet of the catalyst beds A and/or B, the content of saturated hydrocarbons in the resulting product, the pressure drop in the reactor ($\Delta P$)

TABLE III

| Running period | CATALYST A alone | | | | | | |
|---|---|---|---|---|---|---|---|
| | 125 | 500 | 1000 | 1500 | 2000 | 3000 | 3500 |
| T° C at the inlet of the catalyst bed | 323 | 326 | 328 | 329 | 329 | 331 | 337 |
| % b.w. of saturated hydrocarbons in the resulting product | 13 | 13.5 | 13.5 | 12.5 | 12 | 14 | 12.5 |
| $\Delta P$ reactor (bars) | 1.0 | 1.2 | 1.6 | 2.3 | 3.3 | 7.4 | 10.2 |

TABLE IV

| Running period | CATALYST B alone | | | | |
|---|---|---|---|---|---|
| | 125 | 500 | 1000 | 1500 | 2050 |
| T° C at the inlet of the catalyst bed | 324 | 326 | 328 | 331 | 336 |
| % b.w. of saturated hydrocarbons in the resulting product | 50 | 49.5 | 49 | 50.5 | 50.5 |
| $\Delta P$ reactor (bars) | 1.1 | 1.5 | 2.7 | 5.5 | 10.1 |

TABLE V

| Running period | CATALYSTS A+B (ratio of B to A by weight = 4/1) | | | | | | | |
|---|---|---|---|---|---|---|---|---|
| | 125 | 500 | 1000 | 1500 | 2000 | 3000 | 4000 | 4250 |
| T° C at the inlet of catalyst bed A | 308 | 314 | 317 | 316 | 318 | 319 | 322 | 330 |
| T° C at the inlet of catalyst bed B | 333 | 336 | 337 | 337 | 338 | 340 | 343 | 345 |
| % b.w. of saturated hydrocarbons in the resulting product | 50.5 | 50.5 | 52 | 50.5 | 50 | 49 | 49.5 | 50 |
| P reactor (bars) | 1.1 | 1.1 | 1.2 | 1.5 | 2.0 | 4.3 | 8.7 | 10.0 |

*A sample of the product withdrawn after 4000 hours 15 of run has the following characteristics:

| | |
|---|---|
| $d_4^{15}$ | : 0.945 |
| S ppm by weight | : 108 |
| Aromatics % b.w | : 50.5 |
| Conradson carbon % b.w | : 0.7 |
| Viscosity cst at 20° C | : 10.1 |
| Viscosity cst at 50° C | : 4.56 |
| Bromine number | : 0 |

The comparison of the results of these three experiments shows that only experiment No 3, conducted according to the invention, provides for the production, over a long period, of a sufficiently hydrogenated product. Moreover, all along the experiment, the product is obtained with a yield by weight close to 100%.

EXAMPLE 2

In this example, two additional catalysts are prepared:

The first catalyst (CATA A') to be used at the top of the reactor is prepared in the following manner:

To the alumina carrier used for the manufacture of the catalyst A of example 1, there is incorporated, in the same manner, 3.4% b.w. of NiO and 24.7% of WO$_3$.

The second catalyst (CATA B') to be placed in the reactor after catalyst A', and which is prepared as the catalyst B of example 1 contains 10% b.w. of NiO and 10% b.w. of WO$_3$.

Both catalysts are placed in successive fixed beds in the reactor in the sequential order A'-B' and with a ratio by weight of B'/A' = 4/1; they are presulfurized as described in example 1.

The feed charge A is then subjected to the same experiment as experiment 3 of example 1. The results obtained are summarized in the following table:

TABLE VI

| Running period | 125 | 500 | 1000 | 1500 | 2000 | 2500 | 2650 |
|---|---|---|---|---|---|---|---|
| T° C at the inlet of catalyst bed A' | 303 | 311 | 314 | 317 | 319 | 324 | 329 |
| T° C at the inlet of catalyst bed B' | 334 | 337 | 337 | 338 | 341 | 345 | 350 |
| % b.w. of saturated hydrocarbons in the final product | 35 | 25.5 | 25.5 | 26 | 24.5 | 25 | 25.5 |
| ΔP reactor (bars) | 1.1 | 1.3 | 2.0 | 3.0 | 4.7 | 7.5 | 10.1 |

System A'-B' is clearly less efficient than system A-B.

EXAMPLE 3

In this example, two additional catalysts are prepared:

The first catalyst (CATA A'') to be used at the top of the reactor is prepared as follows:

To the alumina carrier used for the manufacture of catalyst A of experiment 1, is incorporated, in the same manner, 10% by weight of NiO and 6.2% by weight of MoO$_3$, the molybdenum oxide being obtained from ammonium paramolybdate.

The second catalyst (CATA B'') to be used in the reactor after catalyst A'', is prepared as catalyst B of example 1 and contains 3.4% by weight of NiO and 15.4% by weight of MoO$_3$.

With the use of these two catalysts, an experiment identical to that of example 2 is conducted.

After 4000 hours of run, the following results are obtained:

Inlet temperature of catalyst A'': 328° C
Inlet temperature of catalyst bed B'': 348° C
% by weight of saturated hydrocarbons in the resulting product: 21%
ΔP in the reactor in bars: 9

The catalytic system A''-B'' is comparable, as far as stability is concerned with system A-B, but is less active.

EXAMPLE 4

This example concerns the treatment of a cut boiling in the range of 200°–360° C, obtained by distillation of a steam-cracking residue (charge D). The catalytic system comprises at the top of the reactor a catalyst A''' containing 10% by weight of CoO and 6.2% by weight of MoO$_3$ and prepared with the same alumina carrier as used for the manufacture of catalyst A in example 1; the molybdenum oxide is, as in example 3, obtained from ammonium paramolybdate. The second catalyst placed in the reactor after catalyst A''' is catalyst B described in example 1. The ratio by weight of these two catalysts is B/A''' = 5 : 1.

The operating conditions are as follows:
ppH$_2$ bars = 100
PPH = 0.5 kg of hydrocarbon charge per kg of catalyst and per hour
H$_2$/hydrocarbons = 1300 liters (NTP)/liter.

The results obtained are summarized in the following table:

TABLE VII

| Running period | 125 | 500 | 1000 | 1500 | 2000 | 3000 | 4000 | 5000* | 5500 |
|---|---|---|---|---|---|---|---|---|---|
| T° C at the inlet of catalyst bed A | 308 | 315 | 316 | 316 | 317 | 317 | 318 | 320 | 330 |
| T° C at the inlet of catalyst bed B | 332 | 336 | 337 | 338 | 338 | 339 | 340 | 340 | 345 |
| % b.w. of saturated hydrocarbons in the product | 86 | 86 | 85.5 | 85 | 85.5 | 86 | 86.5 | 87 | 86 |
| P reactor (bars) | 1.0 | 1.1 | 1.0 | 1.1 | 1.2 | 1.7 | 3.5 | 7.5 | 10.0 |

*A sample of the product withdrawn after 5,000 hours of run has the following characteristics:
d$_4^{15}$ : 0.881
Sppm by weight : 12
Aromatics % by weight : 14 (C/H = 6.74)
Conradson carbon % b.w. : 0.002
Viscosity cst at 20° C : 3.01
Distillation ASTM ° C
  IP : 124
  10 % : 187
  50 % : 214
  90 % : 274
  FP : 312
Bromine number : 0

The catalytic system A'''-B results, as the catalytic system A-B, in excellent performances.

EXAMPLE 5

This example concerns the treatment of a cut boiling in the range of 200°–330° C, obtained by distillation of a steam-cracking residue (charge C). The catalytic system is identical to that of experiment 3 of example 1, and the operating conditions are the same.

After 4250 hours of run, the following results are obtained:
Temperature at the inlet of catalyst bed A: 318° C
Temperature at the inlet of catalyst bed B: 340° C
% b.w. of saturated hydrocarbons in the product: 91

ΔP reactor bars): 1.7
The product obtained after 4250 hours of run has the following characteristics:

| | |
|---|---|
| $d_4^{15}$ | : 0.877 |
| Sppm by weight | : 23 |
| % aromatics by weight | : 9 |
| Viscosity cst | : 15.3 at 34° C |
| Bromine number | : 0 |
| Cold withstanding | : temperature lower than −60° C |
| Flash point | : 42° C |
| Smoke point | : 20 mm |
| Existent gums | : 1 mg/100 ml |
| Corrosion copper blade | : 1a (2 hours at 100° C) |
| ASTM distillation ° C | |
| IP | : 145 |
| 10 % | : 189.5 |
| 50 % | : 213 |
| 90 % | : 268 |
| FP | : 293 |
| Lower heating value (LHV) | : 9030 Kcal/liter |

This product is an excellent base for the production of jet fuel of high energy content per volume unit (Lower heating value of conventional kerosene = 8200 Kcal/liter).

EXAMPLE 6

After 4250 hours of run with the charge C and the catalytic system A-B, under the operating conditions of experiment 3 of example 1 (example 5), the operating conditions are changed to the following:
ppH₂ bars = 40
PPH = 2 kg of hydrocarbon charge/kg of cata/hour
H₂/hydrocarbons = 750 liters/liter
After 1750 hours of run under these conditions, i.e. after a total operating period of 6000 hours, the following results are obtained:
Temperature at the inlet of catalyst bed A: 320° C
Temperature at the inlet of catalyst bed B: 340° C
% b.w. of saturated hydrocarbons in the product: 13
Bromine number: 0
ΔP reactor (bars): 6.1

EXAMPLE 7

This example concerns the use of a catalyst system identical to that used in experiment No 3 of example 1 and the treatment of a cut boiling in the range of 200°–250° C, obtained by distillation of a steam-cracking residue (charge B).
The operating conditions are as follows:
ppH₂ bars: 100
PPH: 0.8 kg of hydrocarbon charge/kg catalyst hour
H₂/hydrocarbons: 1300 liters/liter
After 2000 hours of run, the following results are obtained:
Temperature at the inlet of catalyst bed A: 315° C
Temperature at the inlet of catalyst bed B: 335° C
% b.w. of saturated hydrocarbons in the product: 99
ΔP reactor (bars: 1

EXAMPLE 8

In this example, the treated charge is a reforming residue (charge E); the catalyst system is system A-B of experiment 3 of example 1.
The operating conditions are as follows:
ppH₂ bars = 90
PPH = 0.5 kg of hydrocarbon charge/kg of catalyst/hour H₂/HC = 1200 liters/liter
After 3000 hours of run, the following results are obtained:
Temperature at the inlet of catalyst bed A: 317° C
Temperature at the inlet of catalyst bed B: 338° C
% b.w. of saturated hydrocarbons in the product: 85
ΔP reactor (bars): 1

We claim:
1. A process for hydrogenating an unsaturated heavy hydrocarbon cut containing at least 80% by weight of alkylaromatic, polyaromatic, indenic and/or alkenylaromatic hydrocarbons and boiling above 200° C under atmospheric pressure, comprising passing said cut in the presence of hydrogen over a first catalyst and then over a second catalyst, each catalyst containing an alumina carrier, at least one molybdenum and/or tungsten compound and at least one nickel and/or cobalt compound, the ratio

$$R = \frac{\text{Ni and/or Co}}{\text{W and/or Mo}},$$

in which the proportions are expressed in gram-atoms of metals, being from 1.5 : 1 to 10 : 1 for the first catalyst and from 0.1 : 1 to 1 : 1 for the second catalyst, and the alumina carrier of the first catalyst having a heat of neutralization by ammonia absorption lower than 10 calories per gram at 320° C under an ammonia pressure of 300 nm of mercury.

2. A process according to claim 1, in which the ratio R is from 2 : 1 to 5 : 1 for the first catalyst and from 0.25: 1 to 0.6 : 1 for the second catalyst.

3. A process according to any of claim 1 in which both catalysts are placed one after the other in a single reaction zone.

4. A process according to any of claim 1, in which the second catalyst comprises an alumina carrier of the same specifications as those of the first catalyst.

5. A process according to any of claim 1, in which each catalyst contains nickel and tungsten.

6. A process according to any of claim 1, in which the metals of the catalysts are in the sulfurized form.

7. A process according to claim 1, in which the temperature is from 200° to 400° C and the pressure from 10 to 300 bars.

8. A process according to claim 1, in which the ratio b.w. of the second catalyst to the first catalyst is from 1 : 1 to 9 : 1.

9. A process according to claim 1, in which the ratio by weight of the second catalyst to the first catalyst is from 1.8 : 1 to 4 : 1.

10. A process according to claim 1, in which the heavy hydrocarbon cut contains from 0 to 10% by weight of saturated hydrocarbons and from 90 to 100% by weight of alkylaromatic, polyaromatic, indenic and/or alkenylaromatic hydrocarbons.

11. A process according to claim 1, in which the heavy hydrocarbon cut contains at least 0.0001% by weight of sulfur.

12. A process according to claim 1, in which the heavy hydrocarbon cut contains from 0.5% to 2% by weight of sulfur.

13. A process according to claim 1, in which the unsaturated cut is a stream-cracking product.

14. A process for hydrogenating an unsaturated heavy hydrocarbon cut containing at least 80% by weight of alkylaromatic, polyaromatic, indenic and/or alkenylaromatic hydrocarbons having a bromine number of at least 3 g. per 100 g. and boiling above 200° C under atmospheric pressure, comprising passing said cut in the presence of hydrogen over a first catalyst and then over a second catalyst, each catalyst containing an alumina carrier, at least one molybdenum and/or tungsten compound and at least one nickel and/or cobalt compound, the ratio $$R = \frac{\text{Ni and/or Co}}{\text{W and/or Mo}},$$

in which the proportions are expressed in gram-atoms of metals, being from 1.5 : 1 to 10 : 1 for the first catalyst and from 0.1 : 1 to 1 : 1 for the second catalyst, and the alumina carrier of the first catalyst having a heat of neutralization by ammonia absorption lower than 10 calories per gram at 320° C under an ammonia pressure of 300 mm of mercury.

15. The process of claim 1, wherein said alumina carrier has a heat of neutralization below 7 calories per gram.

16. The process of claim 1, wherein the unsaturated cut has a bromine number of at least 10 g. per 100 g.

* * * * *